United States Patent [19]

Morris

[11] 4,038,876

[45] Aug. 2, 1977

[54] ACCELERATION ERROR COMPENSATED ATTITUDE SENSING AND CONTROL APPARATUS AND METHOD

[75] Inventor: Harold D. Morris, Orinda, Calif.

[73] Assignee: Systron Donner Corporation, Concord, Calif.

[21] Appl. No.: 664,059

[22] Filed: Mar. 4, 1976

[51] Int. Cl.² .............................................. G01P 3/00
[52] U.S. Cl. .................... 73/432 R; 33/328; 73/178 R; 73/510
[58] Field of Search ............... 73/510, 432 R, 178 R, 73/178 T; 33/328; 235/150.25

[56] References Cited

U.S. PATENT DOCUMENTS

| | | | |
|---|---|---|---|
| 3,744,309 | 7/1973 | Astengo | 73/178 R |
| 3,974,699 | 8/1976 | Morris | 73/510 |

Primary Examiner—Donald O. Woodiel

Attorney, Agent, or Firm—Flehr, Hohbach, Test, Albritton & Herbert

[57] ABSTRACT

A structural body is monitored in angular position about at least one axis by utilizing a tilt sensor responsive to tilt about the one axis and a sensor responsive to angular acceleration of the body about the one axis. The tilt sensor also responds to the tangential component of angular acceleration and the angular acceleration sensor output contains a component which results from linear acceleration sensitivity along a cross axis of the angular acceleration sensor. The cross axis of the angular accelerometer is aligned with the sensitive axis of the tilt sensor and a portion of the tilt sensor output related to the ratio of the two sensor scale factors is injected into the angular acceleration sensor output to cancel the cross axis sensitivity. A portion of the angular acceleration sensor output related to the distance between the one axis and the mounting position of the tilt sensor is injected into the tilt sensor output to cancel the tangential component of angular acceleration.

24 Claims, 12 Drawing Figures

ACCELERATION ERROR COMPENSATED ATTITUDE SENSING AND CONTROL APPARATUS AND METHOD

BACKGROUND OF THE INVENTION

1. Field of the Invention

This invention relates to an angular position sensing and control apparatus and method and more particularly to such a position sensing and control system which is free of spurious signals contained in the outputs of the sensors in the system due to accelerations which are nondeterminative of angular position.

2. Description of the Prior Art

Difficulty has been experienced in the past in monitoring the angular orientation of a structural body with reference to earth's coordinates and in controlling a platform or other moveable part mounted within the body to maintain a predetermined orientation referenced to earth coordinates while the structural body experiences three dimensional angular and translational motion. The usual approach for monitoring orientation or stabilizing a platform involves the use of a vertical gyro with its attendant disadvantages stemming from its relatively short operating life and deteriorating accuracy as the spinning rotor and gimbal bearings deteriorate with extended use. The wear out life time of the vertical gyro represents a serious and significant problem of periodic replacement as well as a danger or loss of date or erroneous platform position control due to untimely and enexpected gryo failure modes.

Attempts have heretofore been made to control the attitude of one part of a machine with respect to some reference. For example, attempts have been made to control the attitude of the one part by utilizing electrolytic potentiometers or linear accelerometers to provide a gravity-referenced local horizontal. This serves to sense linear acceleration only, and has been found to have numerous disadvantages due to error injection as accelerations other than acceleration of gravity are sensed. Angular acceleration sensors with double integrated output produce an angle indication, but errors due to linear acceleration. sensitivity of the angular accelerations sensor are produced.

There is a need for an angular position sensing and control system which is not subject to the stringent structural replacements placed on component parts associated with the high angular velocity spinning rotor of a gyro, and which is free of the errors associated with spurious acceleration sensitivity associated with tilt sensors and angular accelerometers.

OBJECTS AND SUMMARY OF THE INVENTION

The angular position sensing system is mounted within a structural body having at least one selected axis about which angular rotation may occur. The system contains a tilt or level sensor and an angular accelerometer for the selected axis about which angular position is to be monitored. The tilt sensor has a tilt axis aligned with the selected axis and a linear acceleration sensing axis perpendicular thereto. The angular accelerometer has a sensing axis aligned with the selected axis and a cross axis perpendicular thereto which is sensitive to linear acceleration and which is adjustably aligned with the linear acceleration sensing axis of the tilt sensor. A part of the tilt sensor output is injected into the annular accelerometer output to cancel the cross axis sensitivity therein, and a part of the angular accelerometer output is injected into the tilt sensor output to compensate for tangential acceleration components of angular acceleration sensed by the tilt sensor.

In the method which is utilized for sensing angular position of a structural body or controlling one part of such a body relative to a local horizontal plane about a selected axis, deviation from local horizontal or tilt angle of said one part is measured about the selected axis. Angular acceleration of said one part is measured along an axis parallel to the selected axis. The angular acceleration and tilt angle measurements are compensated for attitude nondeterminative accelerations by respectively injecting a portion of the tilt measurement into the angular acceleration measurements to substantially cancel that portion of angular acceleration measurement resulting from cross axis linear acceleration sensitivity, and by injecting a portion of the angular acceleration measurement into the tilt angle measurement to substantially cancel that portion of tilt angle measurement resulting from tangential acceleration components.

In general it is an object of the present invention to provide an error compensated angular position sensing and control apparatus and method which is substantially free of errors resulting from accelerations nondeterminative of angular positions.

It is another object of the present invention to provide an error compensated angular position sensing and control apparatus which is free of bias error in the presence of oscillatory inputs.

It is another object of the present invention to provide an angular position sensing and control apparatus and method in which errors due to tangential acceleration are eliminated so that small angles of tilt may be sensed.

It is another object of the present invention to provide an error compensated angular position sensing and control apparatus and method utilizing the long term angular position indications of a sensor otherwise susceptible to long term angular position error for providing a wide band indication of angular orientation.

It is another object of the present invention to provide an error compensated angular position sensing and control apparatus and method which may be strapped down to a structural body for measuring large angles of deviation of the body relative to earth's coordinates occurring at low frequencies while subjected to spurious translational motions.

Additional objects and features of the invention will appear from the following description in which the preferred embodiments are set forth in detail in conjunction with the accompanying drawings.

DESCRIPTION OF THE PREFERRED EMBODIMENTS

The invention disclosed herein is useful in several broad areas. The angular position sensing system may be mounted directly to the frame of a structural body for providing indication of body pitch and roll angles relative to a local horizontal plane. Such a configuration is termed a "strap-down" application. When combined with a "strap-down" sensor having its sensitive axis aligned along the nominally vertical body axis and a coordinate transformation circuit, the "strap-down" system provides a true indication of structural body vertical displacement. The angular position sensor may also be mounted on a platform mounted within the structural body and capable of rotation relative to the body about one or more axes. Such a configuration senses platform deviation from a predetermined orientation relative to earth's coordinates. The sensed deviation may be used to generate an error signal for stabilizing the platform in a predetermined orientation. The platform may take the form of a rotatable part attached to the structural body or machine which may be desired to be controlled in attitude relative to earth's coordinates while the structural body or machine moves randomly within the coordinate system. The angular position sensor and control system is useful for control purposes with very low perturbation frequencies over large angles of deviation between the structural body and the referenced coordinate system and is insensitive to attendant acceleration inputs which are not determinative of angular position of the body.

Figure 1:
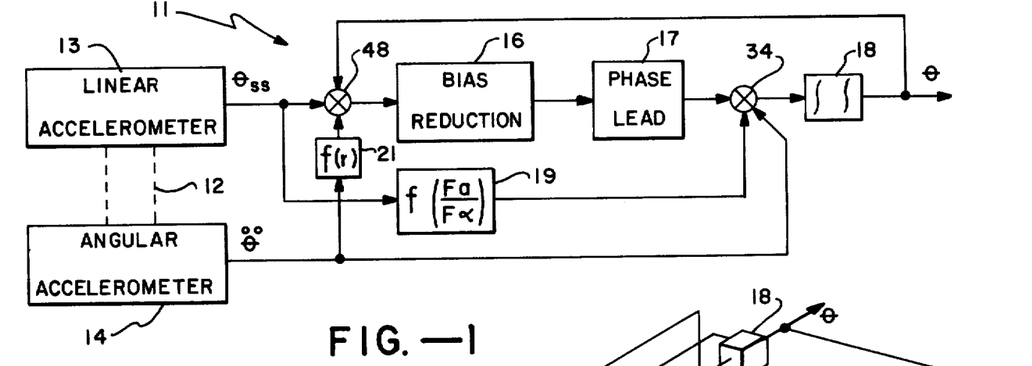
FIG. 1 is a block diagram of an error compensated attitude sensing and control apparatus incorporating the present invention.

As shown in FIG. 1 the angular position sensing assembly 11 may include an alignment base 12 which is adapted to be carried by the structural body which is to be monitored or controlled in attitude. Suitable electrical outlet fittings (not shown) are also provided. A linear accelerometer 13 is mounted on base 12 or directly to the body in such a manner that its sensitive axis is perpendicular to the axis of tilt of the body about which tilt or angular excursion is generated. An angular accelerometer 14 is also mounted on base 12 or directly to the body so that its sensitive axis is parallel to the axis of tilt of the structural body.

The linear accelerometer 13 can be of any suitable type such as that disclosed in U.S. Pat. No. 3,331,253. The angular accelerometer 14 can also be of any suitable type such as that disclosed in U.S. Pat. No. 3,520,196.

Figure 2:
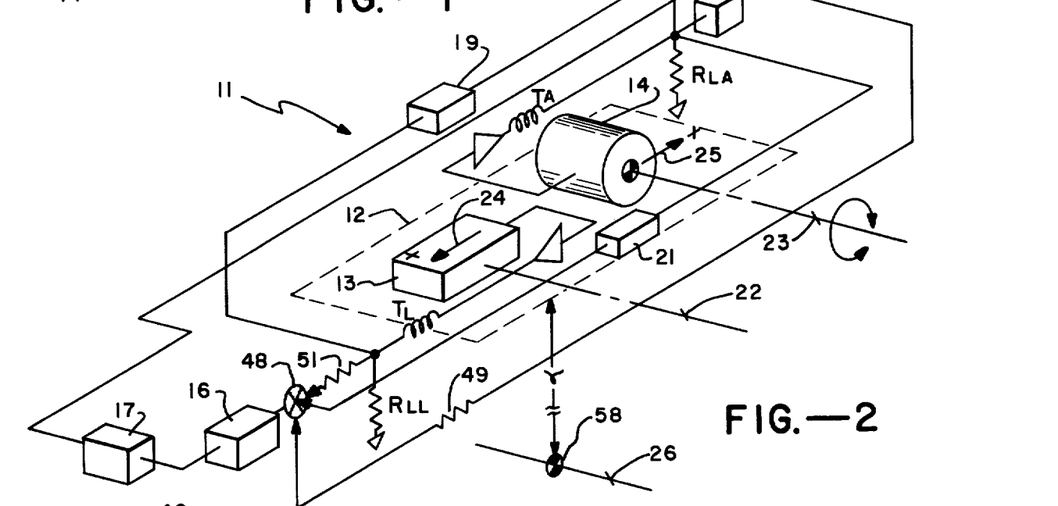
FIG. 2 is an isometric view showing a strapdown configuration of an attitude sensing and control apparatus incorporating the present invention.

As is also seen in FIG. 2 there is mounted in electrical connection with the angular and linear accelerometers 14 and 13 respectively through the electrical outlet fittings, an angular accelerometer bias error susceptibility reduction network 16, a phase lead network 17, and means for combining the output from linear accelerometer 13 with the output from the angular accelerometer 14 such as the circuit 18. Further there is a circuit 19 for coupling a portion of the output signal from linear accelerometer 13 to the output signal from angular accelerometer 14 across the load resistor $R_{LA}$ thereof. A circuit 21 is provided for coupling a portion of the output signal from angular accelerometer 14 to the output signal from linear accelerometer 13 across the load resistor $R_{LL}$ thereof. Note that the accelerometers 13 and 14 are mounted so that a tilt axis 22 of linear accelerometer 13 is substantially parallel with a sensing axis 23 of angular accelerometer 14. A linear acceleration sensing direction for linear accelerometer 13 is marked by arrow 24 having a positive sense as shown. A linear acceleration sensitive axis 25 is shown for angular accelerometer 14, having a positive sense as shown. Arrows 24 and 25 are also substantially parallel to one another and oriented orthogonally relative to tilt axis 22 and sensing axis 23. A selected axis 26 is shown, tilt axis 22 and sensing axis 23 being parallel thereto. Angular attitude about selected axis 26 will be monitored in this embodiment.

Figure 3:
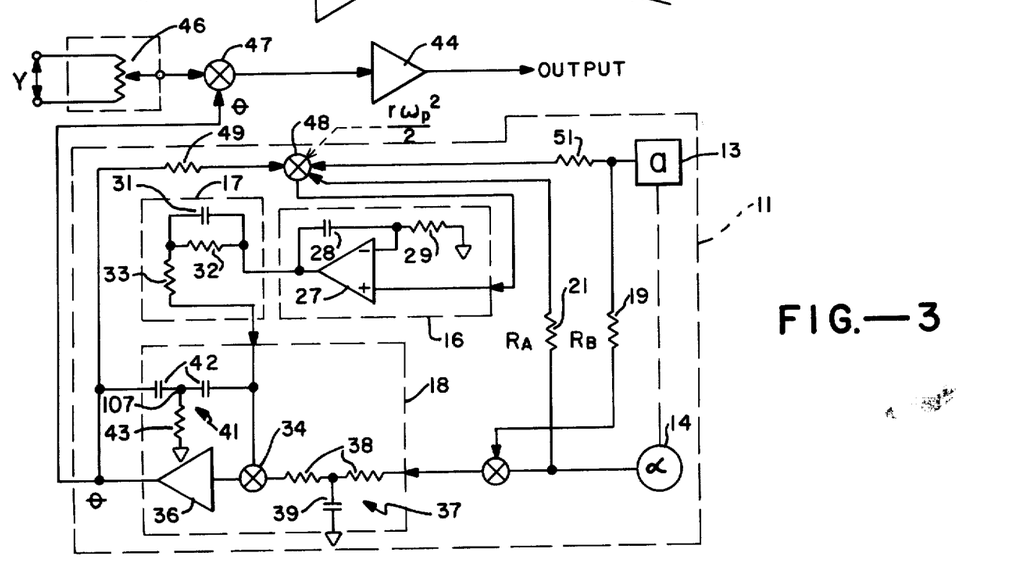
FIG. 3 is a schematic diagram of the configuration of FIG. 2.

As seen in FIG. 3 the bias error reduction network 16 includes an operational amplifier 27 which is connected as a positive follower thereby not inverting the input signal. A feedback capacitor 28 is connected between the output and the negative input terminal of the operational amplifier 27. A resistor 29 is connected between the same negative terminal and ground.

The noninverted output of the operational amplifier 27 is connected to the input of the phase lead network 17. The phase lead network 17 consists of a capacitor 31 in parallel with a resistor 32, with the parallel combination in series with a resistor 33. The output of the phase lead network 17 is connected to a first summing junction 34 within the means 18 for combining the linear and angular accelerometer outputs.

Further reference to FIG. 3 shows the circuit 18 consists of an operational amplifier 36, a circuit 37 connected to the first summing junction 34 with two series resistors 38 and a capacitor 39 from the junction of the two resistors 38 to ground. A circuit 41 forms a feedback loop around the amplifier 36 having two series capacitors 42 with a resistor 43 from the junction of the two capacitors 42 to ground.

Circuit 19 may take the form of a resistor $R_B$ as shown in FIG. 3. Circuit 21 may also take the form of a resistor $R_A$ as shown. The sizes of resistors $R_B$ and $R_A$, which determine the magnitudes of the portions of the outputs cross-coupled, depend on the relative scale factors of the accelerometers and the distance the linear accelerometer 13 is located from the selected rotation axis 26 of the structural body respectively, as hereinafter explained.

The attitude control system may also include a servo amplifier 44 for generating a signal to drive the body or platform to a selected attitude. An attitude select control such as potentiometer 46 may be used providing a select signal connected to a summing point 47. The output from sensing assembly 11 is also connected to summing point 47 for obtaining an error signal therebetween which serves as an input for servo amplifier 44.

Operation of the embodiment of FIGS. 1 through 3 is now described. The desired angle, which may be termed level variation or tilt, may be preset or selected by actuation of the attitude reference control potentiometer 46. The angle is generated about the axis of tilt 26 of the structural body. The position sensing assembly 11 mounted on the structural body, senses the change in angular position thereof in the following manner. The angular acceleration of the body is detected by the angular accelerometer 14 and the signal so generated is transmitted to the combining network 18 for linear and angular accelerometer outputs. Double integration of the angular acceleration signal takes place and an output is produced which is proportional to the change in the angle $\theta$ of the body.

The role of the tilt sensor or linear accelerometer 13 in this embodiment is explained as follows. Let it be assumed for the moment that the initial output conditions of the linear accelerometer 13 and the angular accelerometer 14 are zero. In such a case the output of the combining network 18 is fed back to a second summing junction 48 through a resistor 49, which junction also received the output from the linear accelerometer 13 through a resistor 51. The two outputs in such a case would be equal and opposite since double integration in the circuit 18 performs only one inversion, would cancel each other, and the error signal transmitted to the null bias reduction network 16 would be zero.

In the event that there would be some null offset in the angular accelerometer 14 causing drift and some finite value in the output of the combining network 18, such a signal fed back to the second summing junction 48 when compared with the output from the linear accelerometer 13 would produce an error signal by virtue of that comparison. In turn the error signal would be transmitted to the input of the null bias reduction network 16. Assuming no change in tilt angle, the linear accelerometer 13 provides a steady state indication of the departure of its sensing axis from the local horizontal reference plane. In this instance the change in input to circuit 16 would all be due to angular accelerometer null offset causing integrator drift and output from combining network 18. Since null offset is inverted in sign by the operational amplifier 36, but is not inverted by the positive follower 27, the amplifier input would produce a signal to the first summing junction 34 which would reduce the error by the gain of the amplifier 27.

The feedback circuit for amplifier 27 containing capacitor 28 and resistor 29 can be seen to be a short circuit at high frequencies and an open circuit at zero frequency. The circuit 16 does not therefore "wash out" the desired high frequency output from the angular accelerometer 14, but only steady state outputs such as would be provided by null offset. Thus, the circuit 16 renders the system no longer susceptible to a null offset or other bias in the angular accelerometer 14. The compound amplifier made up of circuits 16 and 18 in combination, will now amplify the output of the linear accelerometer 13 precisely by the ratio of the feedback resistor 49 to the input resistor 51.

As the structural body upon which base 12 is mounted begins to experience motion the linear accelerometer 13, being a relatively high frequency response instrument, senses components of the motion and will produce an output which is delivered through resistor 51 to the summing junction 48. The double integral of the output from the angular accelerometer 14 is delivered through resistor 49 to junction 48 also. An error signal is generated through a comparison of the two signals and is transmitted to the input of the bias reduction network 16. The phase lead network 17 provides for control loop stability for feedback through resistor 49 by arresting phase lag which would cause oscillation, according to basic servo control theory which teaches that sustained oscillation will occur at a gain as high as one and phase lag of 180°. The combining network 18 performs a low pass filtering function for the output from the linear accelerometer 13 when it responds to high frequency linear stimuli.

Referring to the embodiment of FIGS. 1, 2 and 3 discussed above, it is restated that a residual linear acceleration or G sensitivity is nearly always present in any given angular accelerometer 14. The G sensitivity, or linear acceleration sensitive axis, described by arrow 25 is seen to be at a 90° angle from the sensing axis 23 as an angular accelerometer when the pivot axis of the seismic element in the angular accelerometer is substantially parallel to the sensing axis 23. Therefore, if the angular accelerometer 14 is rotated about its sensing axis 23, the direction of the linear acceleration sensitivity may be changed without changing the direction in space of the angular acceleration sensing axis 23. Thus an arbitrary allowable adjustment of rotation about the sensitive axis 23 as an angular accelerometer is available so that linear acceleration sensitive axis 23 may always be adjusted to be co-linear, or parallel with, the sensing axis of the linear accelerometer 13 indicated by arrow 24. Axes 24 and 25 may as desired be aligned with their positive senses in the same direction or in opposite directions. If these two axes are aligned with the polarity of their sensing directions opposed, then circuit 19, represented by resistor $R_B$ in FIG. 3, may be connected between the output of linear accelerometer 13 and the output signal of angular accelerometer 14. When $R_B$ assumes a proper value the residual linear or G sensitivity of the angular accelerometer 14 is cancelled by the signal delivered therethrough.

The value of resistor $R_B$ is a function of the ratio of the scale factor of the linear accelerometer 13 to the scale factor of the angular accelerometer 14. Circuit element 19 must of course be installed without creating substantial signal interaction between the two accelerometers. Typically a resistor $R_B$ may be used for the purpose, having a very large resistance magnitude due to the extremely high sensitivity of the linear accelerometer 13 and the extremely low residual G sensitivity of the angular accelerometer 14. For example, linear accelerometer 13 might have a sensitivity of 7½ volts per G, and the residual G sensitivity of angular accelerometer 14 might be seven and one half millivolts per G. Assuming a load resistor, $R_{LA}$, in FIG. 2, of ten thousand ohms it would require an attenuation of one thousand to one from the output of the linear accelerometer 13 to the load resistor $R_{LA}$. Circuit 19 in this case would contain a resistor $R_B$ one thousand times larger than the load resistor $R_{LA}$ for angular accelerometer 14, or ten megohms. The linear acceleration signal portion coupled thereby would subtract away seven and one half millivolts per G of residual linear acceleration sensitivity in the angular accelerometer 14. A 10 megohm resistor connected between the outputs of the two accelerometers would effectively be no load at all on the linear accelerometer 13, and would influence the scale factor of the angular accelerometer 14 by only one part in a thousand, which would be substantially negligible for most uses of the angular accelerometer.

Figure 8:
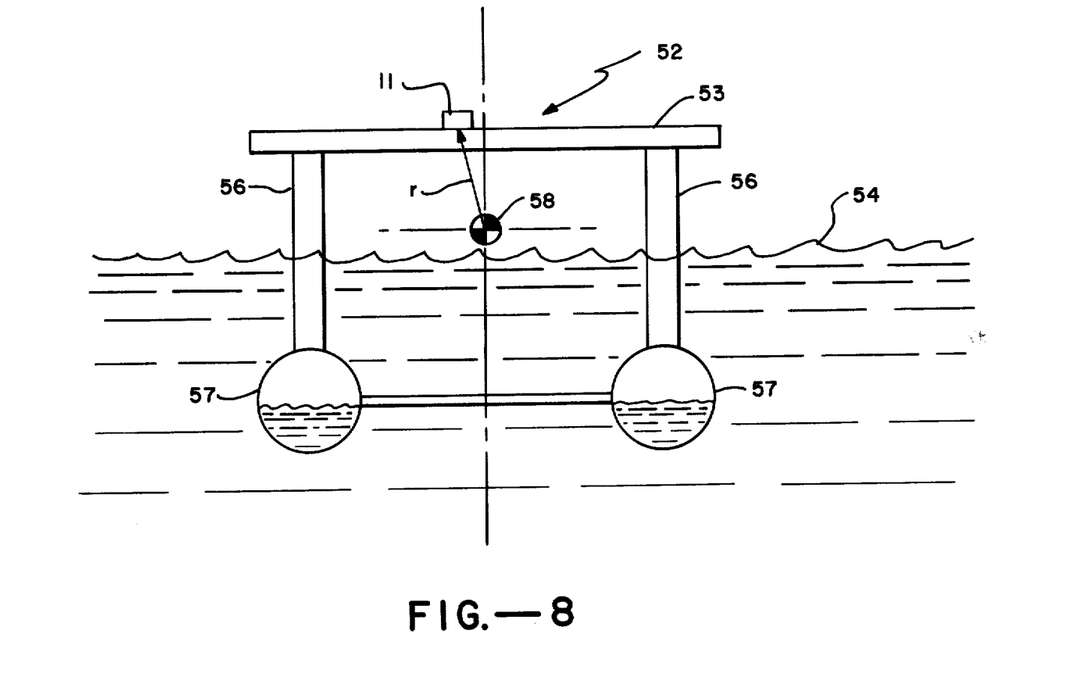
FIG. 8 is a side elevational view of floating platform utilizing the present invention for platform attitude sensing.

A discussion follows related to the use of a cross coupling between the angular accelerometer 14 and the linear accelerometer 13 when they are mounted on a structural body having a center of rotation to electronically compensate or translate the mounting position of the angular position sensor 11 to a point near the center of rotation the structural body. The structural body in FIG. 8 is a floating platform shown generally at 52 having a deck 53 which is held above a water surface 54 by a number of pylons or columns 56. Pylons 56 are supported from a number of ballast tanks 57 which are submerged beneath the water surface 54, so that the center of buoyancy and therefore the height of flotation of deck 53 above water surface 54 may be adjusted by filling or purging tanks 57. Angular position sensing apparatus 11 is shown mounted on deck 53 at a radius $r$ from a center of rotation 58 for the floating platform 52.

If we assume radius $r$ has a nominal value of 64 feet above the center of rotation 58, then an angular acceleration $\alpha$ of one radian per second squared about the center of rotation 58 would produce a lateral or tangential acceleration of $r\alpha = 2G$ at the mounting position of angular position sensing apparatus 11. This is a substantial and strong cross coupling of the angular accelerometer output into the linear accelerometer output. The $r\alpha$ induced 2G signal from the tilt sensor, linear accelerometer 13, is an erroneous signal in that it represents the above-mentioned tangential acceleration, where $\alpha$ is the angular acceleration. The tilt sensor 13 is present only to measure the $G\sin\theta$ acceleration component, where G is the acceleration of gravity and $\theta$ is the departure angle of the sensing axis 24 of tilt sensor 13 from the local horizontal. In this embodiment any other signal sensed in addition to $G\sin\theta$ by tilt sensor 13 represents an error signal in the output of the angular position sensing apparatus 11. This means that in order to cancel the 2G signal in the output from linear accelerometer 13 due to the tangential acceleration, a coupling of an equivalent portion of the signal from the output of the angular accelerometer 14 to the output signal of the linear accelerometer 13 would be required, wherein the equivalent portion is equal to 2G of linear acceleration in terms of the linear acceleration signal scale factor. Thus, the erroneous $r\alpha$ signal is subtracted from the linear channel before it gets a chance to present the error signals to summing point 48.

The angular position sensor and control system, apparatus and method provides automatic control of the tilting or rotational movement of one member of a machine relative to a local reference plane. The local reference plane may be a local horizontal plane. The local horizontal plane is defined as a plane perpendicular to the local long term acceleration vector which includes the acceleration of gravity, G, as a major component. In particular the sensor and control system, apparatus and method can be seen to be adaptable for use in stabilizing a gimballed platform carried on the structural body and rotatable relative thereto. The linear accelerometer 13 in the angular position sensor 11 of FIG. 3 is mounted on the platform and generates spurious signals due to linear accelerations resulting from translational and rotational motions of the structural body upon which it is mounted. Some of these spurious indications are transient in nature, and are blocked by the long time constant where such signals are received in the means for combining 18. It must be borne in mind however that in certain applications long term linear acceleration may be present as in the application associated with the floating platform 52 of FIG. 8. The error compensation coupled from the angular accelerometer 14 to the linear accelerometer 13 which is described above is therefore useful in stable platform applications also. Steady state or long term outputs from the angular accelerometer 14, on the other hand, are "washed out" by means of the feedback loop to the summing point 48 seen in FIG. 3. The feedback produces an error input to the "wash out" or bias reduction network 16 which produces an output to the summing junction 34 at the input to double integrator 18 cancelling steady state signals from the angular accelerometer 14 which appear there. Therefore, long term information only is provided by the level sensor represented by linear accelerometer 13, and short term information only is provided by the means responsive solely to angular motion represented by angular accelerometer 14.

Figure 5:
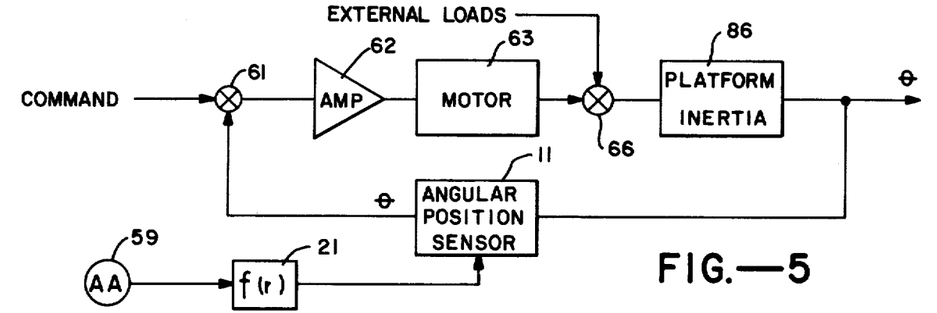
FIG. 5 is a block diagram of an error compensated attitude control apparatus for use in stablizing a platform.
Figure 6:
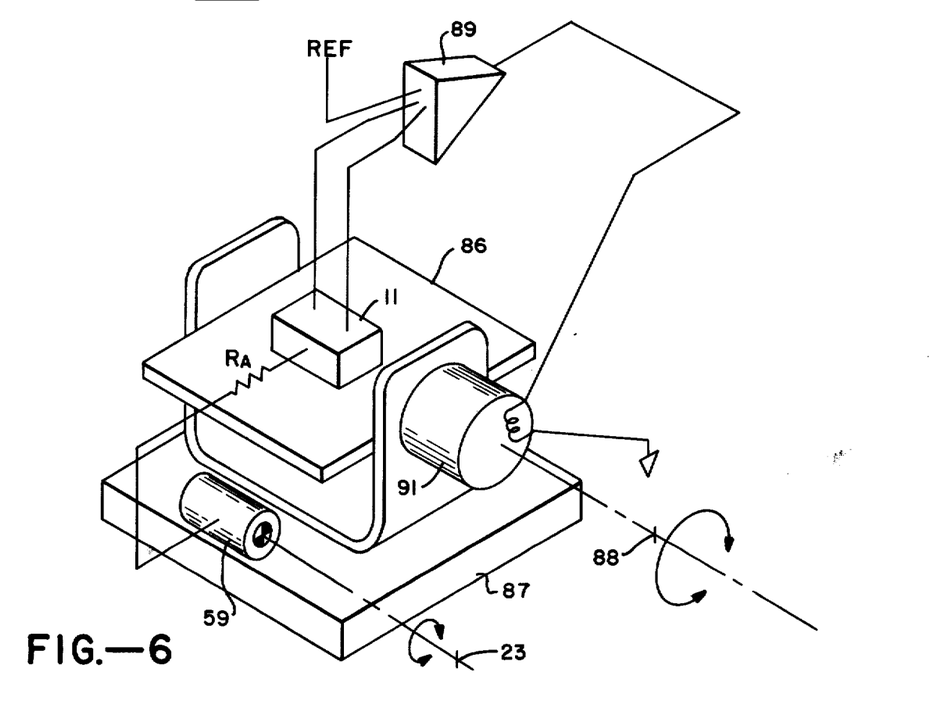
FIG. 6 is an isometric view of one configuration of the control apparatus of FIG. 5.
Figure 7:
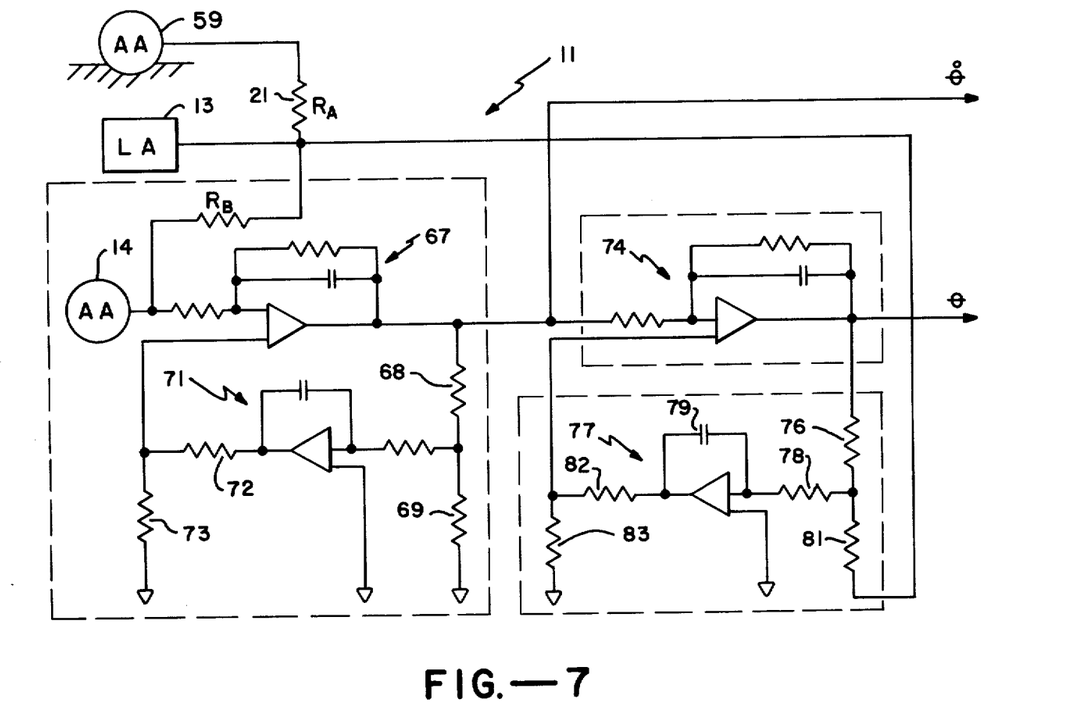
FIG. 7 is a schematic diagram of the configuration of FIG. 5.

Another embodiment of the angular position sensor 11 is shown in FIGS. 5 and 6 which is particularly adaptable to stable platform applications. In this embodiment an angular accelerometer 14 and a level or tilt sensor such as linear accelerometer 13 as shown in FIG. 7 are used. The linear accelerometer 13 provides a steady state output indicative of deviation from the local horizontal. The angular acceleration sensor 14 provides a signal which is indicative of transient deviation in angle. The manner in which the signals in sensor 11 are combined and broadband output indicative of angle is obtained, is discussed above relative to FIG. 3. An additional angular accelerometer 59 is used in a strap-down configuration to obtain the above-mentioned $r\alpha$ correction.

To stabilize a platform, the outputs related to angle from the angular position sensor 11 of FIG. 7 are generally directed to a summing point 61 as shown in FIG. 5. FIG. 5 shows a block diagram of a platform control system which may have a command signal which is also directed to summing point 61. An error signal from summing point 61 is connected to the input of an amplifier 62 which provides power for driving a platform positioning motor 63. Positioning motor 63, in a practical application, must not only drive a platform inertia 86, but must also deal with external loads, such as wind loads. A summing point 66 receives the energy from both external platform loads and the motor 63. In this manner the platform is driven to a predetermined angle. The angular position of the platform is directed to angular position sensor 11. The signal related to angular position is directed to summing point 61 for providing error signals for the input to power amplifier 62.

Referring back to FIG. 7, a circuit diagram is shown for one configuration of the angular position sensor embodiment of FIG. 5. The level sensor is represented by linear accelerometer 13 and the angular accelerometer is shown at 14. Angular accelerometer 14 produces an output which is delivered to a signal integrator 67 which provides an output which rolls off below a low corner frequency. This low roll-off limit is required to eliminate drift at the output of integrator 67 due to null offset in angular accelerometer 14. Null offset is compensated by the feedback loop containing the attenuating network represented by resistors 68 and 69 at the input to the long time constant integrator shown generally at 71, and the attenuating network represented by resistors 72 and 73 at the output of integrator 71. Any long term outputs from signal integrator 67 are "washed out" because the feedback loop, including automatic nulling integrator 71, feeds such long term signals back to the input of signal integrator 67 which cancels steady state output from angular accelerometer 14. This prevents any DC response from occurring at the output from the integrator 67.

The output from integrator 67 is directed to a subsequent signal integrator 74 for producing an output related to angular deviation. The output from signal integrator 74 is also directed through a resistor 76 to the input of an additional auto nulling integrator 77 having a long time constant through proper selection of its input resistor 78 and feedback capacitor 79. The output from linear accelerometer 13 is also delivered to the input of additional automatic nulling integrator 77 through resistor 81. A further attenuating circuit consisting of resistors 82 and 83 at the output of additional automatic null integrator 77 is provided for further increasing the time constant of the feedback loop around subsequent signal integrator 74 through additional automatic null integrator 77.

In the case where the angular position sensing apparatus 11 is mounted on a fixed part of the structural body, when the structural body moves through an angle of 10°, the tilt sensor see the 10° tilt and the angular acceleration sensor 14 senses the attendant angular acceleration. In this case, as described above, it is possible to use a direct coupling between the angular accelerometer 14 and the associated linear tilt sensor 13 in the assembly to cancel the $r\alpha$ error terms previously described. In the stable platform application of FIGS. 5, 6 and 7, however, a platform 86 is stabilized in space relative to earth's coordinates and the angular accelerometer 14 will not provide an angular acceleration output which may be used to compensate for the tangential acceleration experienced by the tilt sensor 13. It is therefore necessary to "hard mount" the additional accelerometer 59 on the structural body if one desires to compensate the $r\alpha$ terms in the tilt sensor output mounted in the angular position sensing apparatus 11 on the platform 86. Means is provided in the form of circuit 21 to couple the $r\alpha$ correction signal to the angular position sensor 11. Such means may take the form of a resistor $R_A$ as seen in FIG. 7. In this fashion the output from linear accelerometer or tilt sensor 13 is compensated for the $r\alpha$ term in an application such as that shown in FIG. 6 where a stable platform is used instead of the strap down configuration on deck 53 of FIG. 8.

For the angular position sensor module 11 as used on the stable platform 86 such as seen in FIG. 6, we have a knowledge of what kind of input will be presented to the sensor module 11. There will be no steady state angular velocity because platform 86 does not rotate. There will likewise be no deviations in angle for any given period of time because platform 86 does not rotate in space. Consequently the schematic diagram of FIG. 7 shows automatic nulling loops around each of the integrators 67 and 74 so the velocity signal at the output of integrator 67 may be nulled dependent upon the characteristic time of integrator 71 and the displacement signal $\theta$ may also be automatically nulled depending upon the characteristic time of integrator 77. The circuit of FIG. 7 will function best for stable platform use because only on a platform will there be no steady state angular velocity or angular displacement.

The DC or long term angular position information is derived from the level sensor represented by linear accelerometer 13 which provides one input to the automatic nulling integrator 77. Another input to the automatic nulling integrator 77 is the attenuated output from signal integrator 74. The long time constant input imposed on automatic null integrator 77 together with the attenuation provided by resistors 82 and 83 delay the error correction feedback to the input of signal integrator 74 so that high frequency angular velocity inputs may appear at the output of integrator 74 for instantaneous indication of angular deviation. Thus, short term angular deviations are provided by the angular accelerometer 14 and steady state or long term angular deviations are provided by the linear accelerometer 13.

Referring to FIG. 6 a single axis platform is shown which may utilize the angular position sensor embodiment described above and shown in FIGS. 5 and 7. A platform 86 mounted within a structural body 87 is capable of rotation about an axis 88. An angular position sensor 11 is mounted on the platform 86 and is connected to a power amplifier 89 which in turn is connected to a torque motor 91 which is mounted on the structural body 87 to provide a torque vector colinear with the axis 88. A reference signal may also be introduced into amplifier 89 which may be related to a predetermined angle to be assmed by platform 86.

Figure 4:
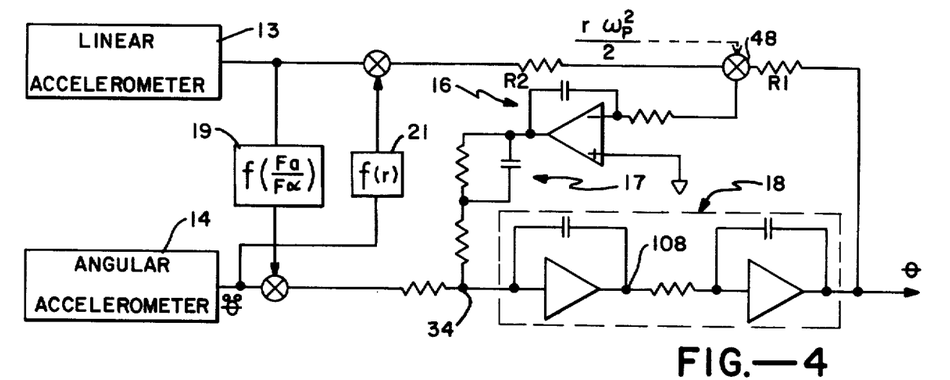
FIG. 4 is a schematic diagram of an alternate configuration of FIG. 2.

Referring to FIG. 4 of the drawings an alternate circuit embodiment for the strap down mode of attitude sensing module 11 is shown. FIG. 4 shows the means for combining the angular and linear accelerometer outputs 18 consisting of two single integrators connected in series. The input to the first integrator is angular acceleration, $\ddot{\theta}$, producing an output angular velocity $-\dot{\theta}$. The output from the first integrator serves as the input to the second integrator producing an output therefrom indicative of angle $\theta$. The output indicative of $\theta$ is fed back to junction 48 through resistor R1. The output from linear accelerometer 13 is connected to junction 48 through resistor R2. With proper polarity for the two values of $\theta$, junction 48 provides no output for properly scaled linear and angular accelerometers 13 and 14 respectively. Junction 48 is used to drive the compensation loop through bias reduction circuit 16 and phase lead network 17. In this manner an automatic nulling or zeroing loop is formed so that there are no transients in the angle output from the angular position sensor 11. Since the sensor 13 and 14 have outputs scaled to match one another, there is no error signal inside the auto-zero loop including the two single integrators 18, and high speed signals from the angular accelerometer 14 are presented in the output $\theta$ without over shooting the steady state angular output from the tilt sensor provided by linear accelerometer 13.

FIG. 4 shows the interconnection between the output of the linear accelerometer 13 for coupling a portion of the tilt sensor output to the output of angular accelerometer 14 for the purpose of compensating linear acceleration sensitivity in the output of the angular accelerometer 14. This is accomplished by connecting circuit 19 therebetween wherein the portion of the output from linear accelerometer 13 is a function of the ratio of the scale factor of linear accelerometer 13 to the scale factor of angular accelerometer 14. A portion of the output from angular accelerometer 14 is coupled to the output signal from tilt sensor 13 for the purpose of compensating tangential acceleration components resulting from angular acceleration which appear in the output of accelerometer 13. This portion of the output from angular accelerometer 14 is a function of the radius from the center of rotation of the structural body being monitored or controlled in angular position at which linear accelerometer 13 is mounted. Circuit 21 accomplishes this latter function.

A description of errors introduced in the tilt sensor output from the linear accelerometer 13 due to what will be termed pitch oscillation for descriptive purposes will now be undertake.

Figure 9:
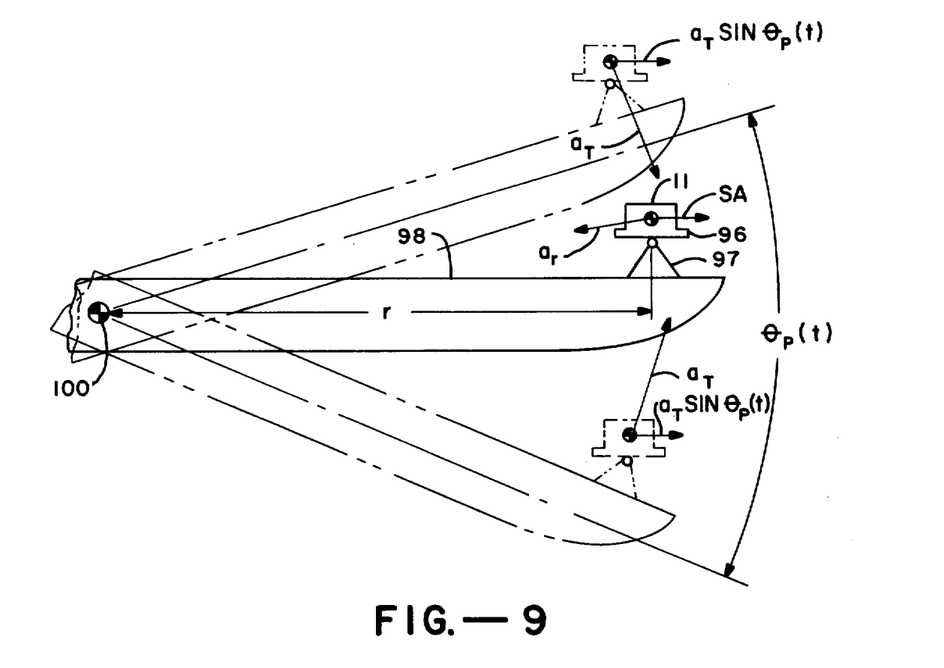
FIG. 9 is a diagram showing use of the attitude sensing and control apparatus on a stable platform.

Reference is first made to FIG. 9 where a stable platform 96 similar to platform 86 of FIG. 6 is shown mounted on a gimbal mount 97 on the bow of a ship 98 which is undergoing pitch through an angle $\theta_p$. Angle $\theta_p$ is exaggerated for clarity. An attitude sensing package 11 is shown mounted on stable platform 96 at a distance $r$ from a pitch axis 100, having components therein such as linear accelerometer 13 and angular accelerometer 14 producing outputs for combination to thereby provide anguaar position indication as hereinbefore described. Analysis shows that where;

$$\theta_p(t) = A_1 \sin \omega_1 t$$
$$W_p(t) = A_1 \omega_1 \cos \omega_1 t$$
$$\alpha_p(t) = -A_1 \omega^2_1 \sin \omega_1 t$$

then radial acceleration is described by the relationship;
$$a_r = r\omega_p^2(t) = -rA_1^2 \omega_1^2 \cos^2 \omega_1 t$$
$$a_r = (-rA_1^2 \omega_1^2/2)(1 + \cos 2\omega_1 t)$$

The peak value is $-rA_1^2 \omega_1^2$. This is substantially the value of radial acceleration along the sensing axis of the tilt sensor or linear accelerometer 13 as pitch angles are relatively small. This relationship is zero at the upper and lower pitch angle limits and peak at zero pitch angle.

Further analysis shows that tangential acceleration is described by the relationship;

$$aT = r\alpha_p(t) = -rA_1 \omega_1^2 \sin \omega_1 t$$

The component along the sensing axis of the linear accelerometer 13 mounted on stable platform 96 to sense pitch tilt is described by the relationship;

$$a_{SA} = a_T \sin\theta_p(t) = a_T \sin(A_1 \sin\omega_1 t)$$
$$\sin(A_1 \sin\omega_1 t) = A_1 \sin\omega_1 t \text{ for small angles}$$
$$a_{SA} = a_T A_1 \sin\omega_1 t = rA_1^2 \omega_1^2 \sin^2\omega_1 t$$
$$a_{SA} = (-r_1 A^2 \omega_1^2/2)(1 - \cos 2\omega_1 t)$$

A peak value of $-rA_1^2\omega_1^2$ occurs which is the same as the peak value for 2, above, but which is zero at zero pitch angle and has peaks at the upper and lower pitch angle limits.

Figure 11:
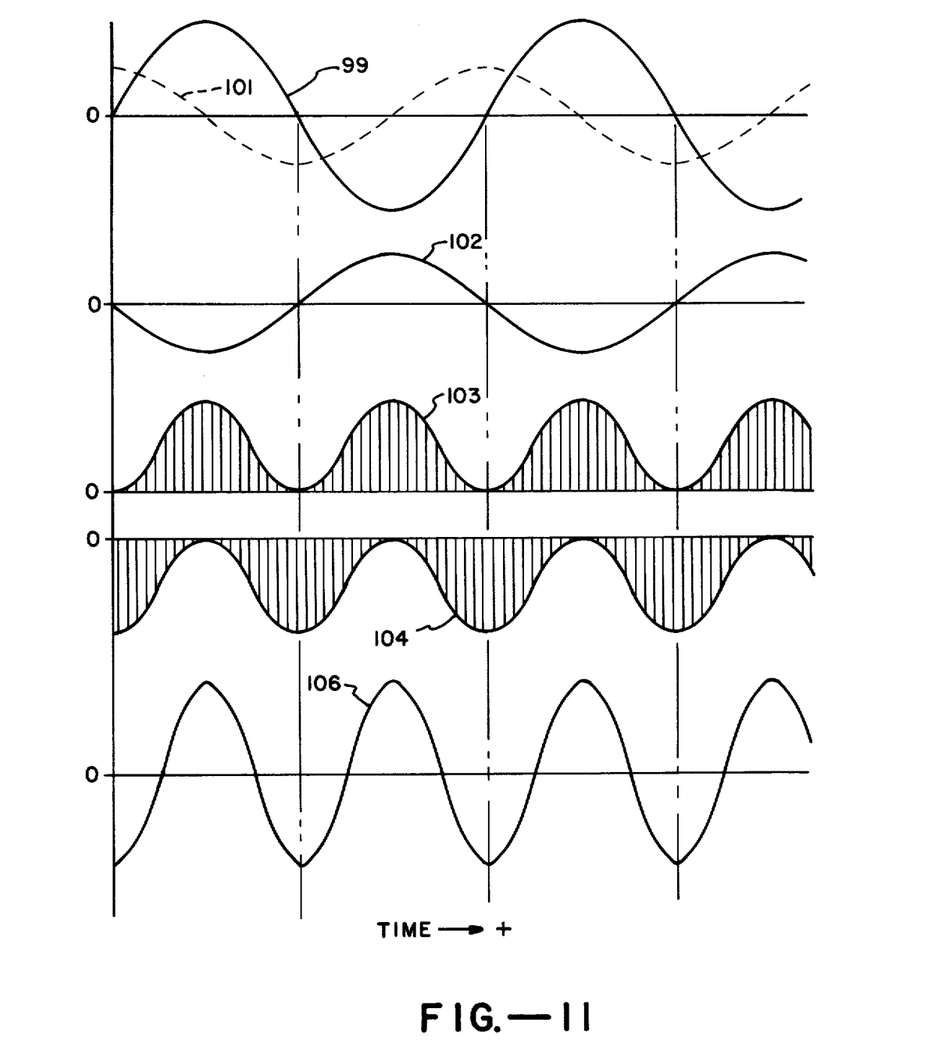
FIG. 11 is a timing diagram of error signals resulting from displacement of the attitude sensing and control apparatus from a rotation axis.

Turning now to the timing diagram of FIG. 11, the pitch angle and pitch angular velocity are seen at 99 and 101 respectively having sine wave shapes. Pitch angular acceleration is seen at 102. The wave form resulting for the tangential acceleration component $a_{SA}$ derived above is seen at 103. The wave form derived above for the radial acceleration $a_r$, aligned with the sensing axis for small pitch angles, is seen at 104. An error sum of the error waves 103 and 104 is shown at 106. The average value of the error sum 106 is zero. The frequency of the error sum wave 106 is twice the pitch frequency, as illustrated in the analysis. The long time constant imposed in the "wash out" circuit 16, shown as a positive follower in FIG. 3 and an inverter in FIG. 4, eliminates error sum 106 in the stable platform embodiment. The long time constant is obtained, as described previously, by proper selection of the feedback capacitor and input resistor in circuit 16.

Figure 10:
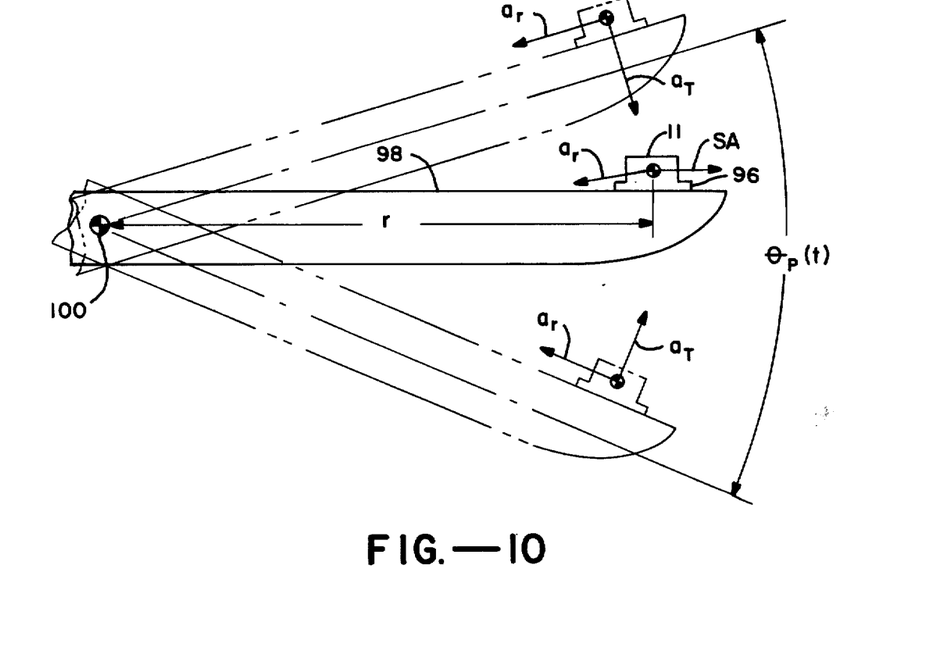
FIG. 10 is a diagram showing use of the attitude sensing and control apparatus in a strapdown mode.

FIG. 10 shows a strapdown installation for attitude sensing package 11, wherein mounting is made directly to the deck of ship 98 at a distance $r$ from pitch axis 100. The mounting is implemented so that $a_T$ is at right angles to sensing axis SA, and no tilt error is introduced thereby. Radial acceleration, $a_r$, is fully coupled with the sensing axis SA and is unipolar due to the squared term $\omega_p^2$. Therefore the only error signal present in the output from the tilt sensor 13 is that of curve 104 in FIG. 11. A measure of angular velocity, $\omega_p$, is available from node 107 in FIG. 3 and node 108 in FIG. 4, in the double integrators 18 shown in each of the figures. The angular velocity $\omega_p$ was previously referred to as $-\dot\theta$ in connection with the description of FIG. 4.

Figure 12:
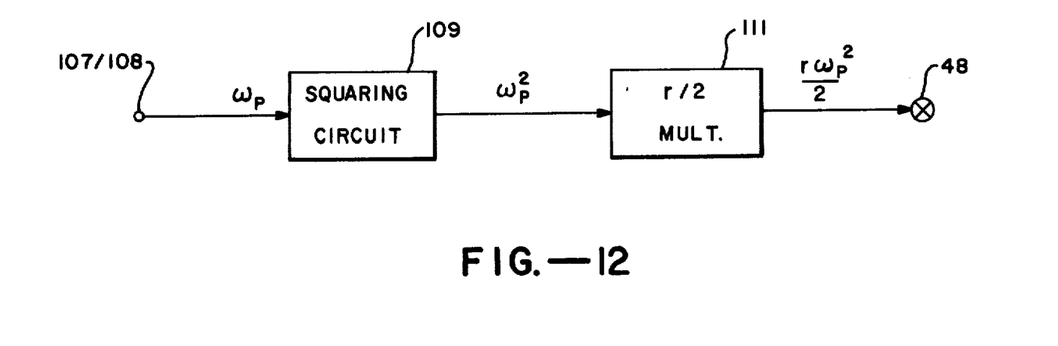
FIG. 12 is partial block diagram showing one correction signal treatment in the present invention.

FIG. 12 is a block diagram showing a squaring circuit 109 for receiving a signal indicative of $\omega_p$ at a terminal marked 107 or 108 and a multiplier 111 for receiving the signal indicative of $\omega_p^2$ introducing a factor related to one half the distance $r$ into the signal, and providing an output indicative of $r\omega_p^2/2$. This latter signal is coupled to summing point 48 in the embodiments of FIGS. 3 and 4. The polarity relative to the polarity of the sensing axis SA is known and the polarity of correction signal $r\omega_p^2/2$ is adjusted accordingly to cancel the error signal 104 in FIG. 11. Thus, while the signal rejection characteristics of the circuit are utilized to eliminate error signal 106 in the stable platform mode, sensitive axis orientation for tilt sensor 13 and measured pitch angular velocity are used to eliminate error signals 103 and 104 in the strapdown mode. The importance of the foregoing is apparent when it is realized that mounting of sensor package 11 250 feet fore or aft of the pitch axis 100 subjects the package 11 to $\pm 1.4G$ tangential acceleration for $\pm 10°$ of pitch and to 0.245 G peak radial acceleration.

It should be noted that the error compensation scheme disclosed herein may be used for reducing linear or angular acceleration errors in the output obtained directly from angular or linear acceleration sensors respectively. As described above, a portion of a linear acceleration indicative output may be coupled to an angular acceleration indicative output to reduce error therein resulting from a linear acceleration sensitivity in the angular accelerometer. In like manner, a portion of an angular acceleration indicative output may be coupled to linear acceleration indicative output to reduce signal in the linear output resulting from tangential acceleration of the linear acceleration sensor. The portion of angular output used for tangential acceleration signal is related to the distance of the linear sensor from an axis of rotation and the ratio of the linear to angular acceleration indicative output scale factors.

An angular or attitude sensing and control apparatus and method has been disclosed which utilizes a tilt sensor and an angular accelerometer with means for converting the angular acceleration output to angle output, together with a circuit for providing direct compensation for error induced by tangential acceleration sensed by the tilt sensor due to angular acceleration at a predetermined radius, and for error induced by linear acceleration sensed by the angular accelerometer.

What is claimed is:

1. An error compensated attitude sensing apparatus comprising
    a support structure
    an angular accelerometer mounted on said support structure for producing an angular acceleration indicative output, said angular accelerometer having an angular acceleration sensing axis and a linear acceleration sensitive axis oriented orthogonally thereto, whereby said angular acceleration indicative output may include a linear acceleration sensitivity output component, a tilt sensor mounted on said support structure for producing an angle of tilt indicative output wherein said angle of tilt is relative to a reference plane, said tilt sensor having tilt axis and a linear acceleration sensing axis in orthogonal relation, said tilt axis being aligned substantially parallel with said angular acceleration sensing axis and said angular accelerometer linear acceleration sensitive axis being aligned substantially parallel with said linear acceleration sensing axis, means for receiving said angular acceleration indicative output and for producing an angle indicative output, means for receiving said angle indicative output and said angle of tilt indicative output and producing a combined angle indicative output, and means for coupling said angle of tilt indicative output to said angular acceleration indicative output in predetermined proportion so that said linear acceleration sensitivity output component therein is substantially cancelled.

2. An error compensated attitude sensing apparatus as in claim 1 wherein said support structure has a center of rotation and said tilt sensor is mounted a predetermined distance therefrom, together with means for connecting a predetermined portion of said angular accereration indicative output to said angle of tilt indicative output, said predetermined portion being dependent upon said predetermined distance, whereby tangential acceleration sensed by said angle of tilt sensor due to angular acceleration about the center of rotation is compensated.

3. An error compensated attitude sensing apparatus as in claim 1 wherein said support structure is a platform together with a framework, means attached to said platform for mounting said platform on said framework for rotational movement relative thereto, and an additional angular accelerometer mounted on said framework for producing an additional angular acceleration indicative output, said framework having a center of rotation with said tilt sensor mounted a predetermined distance therefrom, means for coupling a predetermined portion of said additional angular acceleration indicative output to said angle of tilt indicative output, said predetermined portion being dependent upon said predetermined distance, so that signal related to tangential acceleration in said angle of tilt indicative output due to angular acceleration of said framework are substantially cancelled.

4. An error compensated attitude sensing apparatus comprising a framework, an angular accelerometer mounted on said framework providing an angular acceleration indicative output, a tilt sensor mounted in said framework providing an angle of tilt indicative output, said angle of tilt being relative to a reference plane, said tilt sensor having a tilt axis and a linear acceleration sensing axis in orthogonal relation, said tilt axis being aligned substantially parallel with said angular acceleration sensing axis, means for receiving and converting said angular acceleration indicative output to an angle indicative output, means for receiving said angle indicative output and said angle of tilt indicative output and providing a combined angle indicative output, said last named output being connected to the input of said means for receiving and converting so that transients and drift in said angle indicative output are compensated, said framework having a center of rotation and said tilt sensor being mounted a predetermined distance therefrom, means for connecting a predetermined portion of said angular acceleration indicative output to said angle of tilt indicative output, said predetermined portion being dependent upon said predetermined distance, whereby signal components in said angle of tilt indicative output due to tangential acceleration of said tilt sensor are compensated.

5. An error compensated attitude sensing apparatus comprising a supporting structure, an angular accelerometer mounted on said supporting structure for providing an angular acceleration indicative output, said angular accelerometer having an acceleration sensing axis and a cross axis orthogonal thereto which is linear acceleration sensitive, whereby in the presence of linear acceleration said angular acceleration indicative output includes a cross axis sensitivity output component, a tilt sensor mounted on said support structure providing an angle of tilt indicative output which is relative to a reference plane, said tilt sensor having a tilt axis and a linear acceleration sensing axis oriented orthogonal thereto, said tilt axis being aligned substantially parallel with said angular acceleration sensing axis and said cross axis being aligned substantially parallel with said linear acceleration sensing axis, and means for coupling said angle of tilt indicative output to said angular acceleration indicative output in predetermined proportion to substantially cancel said cross axis sensitivity component.

6. An error compensated attitude sensing apparatus as in claim 5 wherein said support structure is floating and has a center of rotation and said tilt sensor is mounted a predetermined distance therefrom, together with means for coupling said angular acceleration indicative output to said angle of tilt indicative output in proportion to said predetermined distance, whereby indicative of tangential acceleration due to angular acceleration about said center of rotation are substantially cancelled from said angle of tilt indicative output.

7. An error compensated attitude sensing apparatus as in claim 5 together with a framework and means for locating said supporting structure in rotational relation with said framework.

8. An error compensated attitude sensing apparatus as in claim 7 together with an additional angular accelerometer mounted on said framework providing an additional angular acceleration indicative output related to the angular acceleration of said framework, said framework having a center of rotation with said tilt sensor mounted a predetermined distance therefrom, means for coupling a predetermined portion of said additional angular acceleration indicative output to said angle of tilt indicative output said predetermined portion being related to said predetermined distance, so that signal components in said angle of tilt indicative output due to tangential acceleration resulting from angular acceleration of said framework are cancelled.

9. An error compensated attitude sensing apparatus as in claim 6 wherein said means for coupling comprises means for receiving and converting said angular acceleration indicative output to an angle indicative output having a scale factor which is matched with said angle of tilt indicative output, said means for receiving and converting having fast response relative to said means for coupling said angle of tilt indicative output so that transient outputs in said tilt indicative output which appear in said angle indicative output are reduced.

10. An error compensated attitude sensing apparatus comprising a support structure,
- a tilt sensor mounted on said support structure providing an angle of tilt indicative output referenced to a predetermined plane, said tilt sensor having a tilt axis, and a linear acceleration sensing axis oriented orthogonally thereto,
- an angular accelerometer mounted on said support structure providing an angular acceleration indicative output, said angular accelerometer having an angular acceleration sensing axis and a linear acceleration sensitive axis oriented orthogonally thereto, so that in the presence of linear acceleration said angular acceleration indicative output contains a linear acceleration sensitive component, said tilt axis being aligned substantially parallel to said angular acceleration sensing axis and said linear acceleration sensitive axis being aligned substantially parallel to said angular accelerometer linear acceleration sensitive axis,
- means for receiving and converting said angular acceleration indicative output to an angle indicative output, means for coupling said angle of tilt indicative output to said angle indicative output, said angle of tilt indicative output having a scale factor similar to said angle indicative output whereby a combined angle indicative output is provided, said means for receiving and converting having fast response relative to said means for coupling said angle of tilt indicative output, whereby transient outputs in said angle of tilt indicative output are substantially eliminated from said combined angle indicative output, said support structure having a center of rotation and said tilt sensor being mounted a predetermined distance therefrom, together with means for coupling a predetermined portion of said angular accceleration indicative output to said angle of tilt indicative output, said predetermined portion being related to said predetermined distance, so that error signal produced by tangential acceleration sensed by said tilt sensor and appearing in said angle of tilt indicative output is substantially cancelled.

11. An error compensated attitude sensing apparatus comprising a support structure,
- a tilt sensor mounted on said support structure providing an angle of tilt indicative output referenced to a predetermined plane, said tilt sensor having a tilt axis, and a linear acceleration sensing axis oriented orthogonally thereto,
- an angular accelerometer mounted on said support structure providing an angular acceleration indicative output, said angular accelerometer having an angular acceleration sensing axis and a linear acceleration sensitive axis oriented orthogonally thereto, so that in the presence of linear acceleration said angular acceleration indicative output contains a linear acceleration sensitive component, said tilt axis being aligned substantially parallel to said angular acceleration sensing axis and said linear acceleration sensitive axis being aligned substantially parallel to said angular accelerometer linear acceleration sensitive axis,
- means for receiving and converting said angular acceleration indicative output to an angle indicative output, means for coupling said angle of tilt indicative output to said angle indicative output, said angle of tilt indicative output having a scale factor similar to said angle indicative output whereby a combined angle indicative output is provided, said means for receiving and converting having fast response relative to said means for coupling said angle of tilt indicative output,
- whereby transient outputs in said angle of tilt indicative output are substantially eliminated from said combined angle indicative output, said support structure including a platform together with a framework, means for supporting said support structure in said framework for rotational motion therewith,
- and an additional angular accelerometer mounted on said framework providing an additional angular acceleration indicative output related to the angular acceleration thereof,
- said framework having a center of rotation with said tilt sensor mounted a predetermined distance therefrom,
- means for coupling a predetermined portion of said additional angular acceleration indicative output to said angle of tilt indicative output, said predetermined portion depending on said predetermined distance, so that components in said angle indicative output due to tangential acceleration of said tilt sensor are substantially removed.

12. An error compensated attitude sensing apparatus comprising a support structure,
- an angular accelerometer mounted on said support structure providing an angular acceleration indicative output, said angular accelerometer having an angular acceleration sensing axis and a linear acceleration sensitive axis oriented orthogonal thereto, said angular acceleration indicative output thereby having a linear acceleration sensitive output component included in the presence of linear acceleration,
- a tilt sensor mounted on said support structure providing an angle of tilt indicative output related to a reference plane,
- said tilt sensor having a tilt axis and a linear acceleration sensitive axis is orthogonal relation, said tilt axis being aligned substantially parallel with said angular acceleration sensing axis and said linear acceleration sensing axis being aligned substantially parallel with said angular accelerometer linear acceleration sensitive axis,
- means for coupling a predetermined portion of said angle of tilt indicative output to said angular acceleration sensitivity output component is substantially cancelled,
- means for passing low frequency angle of tilt indicative output,
- means for passing high frequency angular acceleration indicative output,
- means for combining said high and low frequency outputs providing an angle output, a platform mounted on said support structure for rotational movement therewith about at least one axis, means mounted on said one axis for urging said platform rotationally toward a rotational position responsive to said angle output.

13. The method of sensing the attitude of a framework and compensating the attitude sensing apparatus for spurious sensing signals comprising the steps of obtaining an angular acceleration indicative signal containing a spurious linear acceleration signal component therein of known scale factor, obtaining a linear acceleration indicative signal having a sense opposed to said spurious linear acceleration signal component, and cancelling the spurious linear acceleration signal component by injecting into the angular acceleration indicative signal a portion of the linear acceleration indicative signal related to the ratio of the signal scale factors.

14. The method of sensing as in claim 13 wherein said linear acceleration indicative signal contains a component resulting from tangential acceleration occurring as a result of the angular acceleration of the framework and the radius between the linear acceleration sensor and the axis of rotation of the framework, together with the step of cancelling the tangential acceleration component with a portion of the angular acceleration indicative signal related to the radius of rotation.

15. An error compensated acceleration sensor for mounting on a body to be acceleration monitored, comprising an angular accelerometer mounted on the body providing an angular acceleration indicative output, said angular accelerometer having an angular acceleration sensing axis and a linear acceleration sensitive axis, said angular acceleration indicative output thereby containing an error component when the body is subjected to linear acceleration having a component colinear with said linear acceleration sensitive axis, a linear accelerometer mounted on the body providing a linear acceleration indicative output and having a linear acceleration sensing axis, said linear acceleration sensing axis being aligned substantially parallel to said linar acceleration sensitive axis, ane means for coupling a portion of said linear acceleration indicative output to said angular acceleration indicative output for reducing said error component.

16. An error compensated acceleration sensor as in claim 15 wherein the body has an axis of rotation and said linear accelerometer is mounted a predetermined distance from said axis of rotation, whereby said linear acceleration indicative output contains a component corresponding to tangential acceleration of said linear accelerometer resulting when the body is accelerated about said axis or rotation, and means for coupling a signal portion of said angular acceleration indicative output to said linear acceleration indicative output, said signal portion being determined by said predetermined distance and the ratio of linear acceleration indicative output scale factor to angular acceleration indicative output scale factor, whereby error in said linear acceleration indicative output due to tangential acceleration of the body is reduced.

17. An error compensated acceleration sensor as in claim 15 wherein the body has an axis of rotation and said linear accelerometer is mounted a predetermined distance from said axis of rotation with said linear acceleration sensing axis being aligned substantially with the direction from said axis of rotation to said linear accelerometer, whereby said linear acceleration indicative output contains a component corresponding to radial acceleration of said linear accelerometer resulting when the body is moving at an angular velocity about said axis of rotation, means for providing an angular velocity indicative output, and means for coupling a signal portion of said angular velocity indicative output to said linear acceleration indicative output, said signal portion being determined by said predetermined distance and the square of said angular velocity indicative output, whereby error in said linear acceleration indicative output due to radial acceleration of the body is reduced.

18. An error compensated acceleration sensor as in claim 17 wherein said means for providing an angular velocity indicative output is an integrator coupled to receive said angular acceleration indicative output.

19. An error compensated acceleration sensor for mounting on a body to be acceleration monitored, the body having an axis of rotation, comprising an angular accelerometer mounted on the body providing an angular acceleration output, said angular accelerometer having an angular acceleration sensing axis, a lineat accelerometer mounted on the body providing a linear acceleration sensitive output and having a linear acceleration sensitive axis, said linear accelerometer being mounted a predetermined distance from the axis or rotation, whereby said linear acceleration indicative output contains a component corresponding to tangential acceleration of said linear accelerometer when the body is accelerated about the axis of rotation, and means for coupling a signal portion of said angular acceleration indicative output to said linear acceleration indicative output, said signal portion being determined by said predetermined distance and the ratio of linear acceleration indicative output scale factor to angular acceleration indicative output scale factor, whereby error in said linear acceleration indicative output due to tangential acceleration of the body is reduced.

20. An error compensated acceleration sensor for mounting on a body to be acceleration monitored, the body having an axis of rotation, comprising a linear accelerometer mounted on the body providing a linear acceleration sensitive output therefrom and having a linear acceleration sensitive axis, said linear accelerometer having a mount desposed a predetermined distance from the axid of rotation, said linear acceleration sensitive axis being in substantial alignment with the direction between said axis of rotation and said mount, whereby said linear acceleration sensitive output contains a component corresponding to radial acceleration of said mount when the body is movinng at an angular velocity about the axis of rotation, means for providing an output indicative of the angular velocity of the body, said signal portion being determined by said predetermined distance and the square of said angular velocity indicative output, whereby error in said linear acceleration indicative output due to radial acceleration of the body is reduced.

21. An error compensated accleration sensor as in claim 20 together with an angular acclerometer providing an angular accleration indicative output and having an sensitive axis aligned in substantially parallel relation with the axis of rotation, said means for providing an angular velocity indicative output comprising an integrator for receiving said angular accleration indicative output.

22. An error compensated attitude sensing apparatus comprising
   a support structure havng a center of rotation
   an angular acclerometer mounted on said support structure for producing an angular acceleration indicative output,
   a tilt sensor mounted on said support structure a predetermined distance from said center of rotation for producing an angle of tilt indicative output wherein said angle of tilt is relative to a reference plane,
   said tilt sensor having a tilt axis and a linear acceleration sensing axis in orthogonal relation, said tilt axis being aligned substantially parallel with said angular acceleration sensing axis and said linear acceleration sensing axis having a component aligned along the direction between said tilt sensor and said center of rotation, whereby said angle of tilt indicative output contains a component corresponding to radial acceleration when said support structure is moving at an angular velocity about said center of rotation,
   means for receiving said angular acceleration indicative output and for producing an angular velocity indicative output and an angle indicative output,
   means for receiving said angle indicative output and said angle of tilt indicative output and producing a combined angle indicative output,
   and means for coupling a signal portion of said angular velocity indicative output to said tilt indicative output, said signal portion being determined by said predetermined distacne and the square of said anguar velocity indicative output, whereby error in said tilt indicative output due to radial acceleration of said support structure is reduced.

23. An error compensated accleration apparatus as in claim 22 wherein said angular acclerometer has an angular acceleration sensing axis and a linear acceleration sensitive acis oriented orthogonally thereto, whereby said angular acceleration indicative output includes a linear acceleration sensitivity output component in the presence of linear acceleration, said angular accelerometer linear acceleration sensitive axis being aligned substantially parallel with said tilt sensor linear acceleration sensing axis,
   and means for coupling said angle of tilt indicative output to said angular acceleration indicative output in predetermined proportion, so that said linear acceleration sensitivity output component is substantially reduced.

24. An error compensated accelerated apparatus as in claim 22 together with means of coupling a predetermined portion of said angular acceleration indicative output to said angle of tilt indicative output, said predetermined portion being dependent upon said predetermined distance, whereby tangential acceleration sensed by said angle of tilt sensor due to angular acceleration about the center of rotation is compensated.

* * * * *